US006832099B2

(12) United States Patent
Twigg et al.

(10) Patent No.: US 6,832,099 B2
(45) Date of Patent: Dec. 14, 2004

(54) ANTENNAS

(75) Inventors: Helena Kathryn Twigg, Romsey Hants (GB); Anthony Peter Hulbert, Southampton Hants (GB)

(73) Assignee: Roke Manor Research Limited, Romsey (GB)

( * ) Notice: Subject to any disclaimer, the term of this patent is extended or adjusted under 35 U.S.C. 154(b) by 454 days.

(21) Appl. No.: 09/867,756

(22) Filed: May 31, 2001

(65) Prior Publication Data

US 2002/0016181 A1 Feb. 7, 2002

(30) Foreign Application Priority Data

May 31, 2000 (GB) ............................................ 0013025

(51) Int. Cl.[7] .................................................. H04B 1/38

(52) U.S. Cl. ................. 455/550; 455/575.6; 455/575.7; 455/66.1; 455/86

(58) Field of Search ................................ 455/550, 66.1, 455/575.6, 575.7, 82; 453/82; 224/197; 343/763

(56) References Cited

U.S. PATENT DOCUMENTS 5,404,577 A * 4/1995 Zuckerman et al. ....... 455/66.1

FOREIGN PATENT DOCUMENTS

| | | |
|---|---|---|
| CH | 529355 | 11/1972 |
| EP | 0977304 | 2/2000 |
| GB | 2198898 | 6/1988 |
| GB | 2265053 | 9/1993 |
| JP | 57206102 | 12/1982 |

* cited by examiner

*Primary Examiner*—Nay Maung
*Assistant Examiner*—Alan T. Gantt
(74) *Attorney, Agent, or Firm*—Crowell & Moring LLP

(57) ABSTRACT

A mobile phone antenna comprising a belt which is adapted to be worn by a user and which comprises an antenna arrangement which in use is coupled to the mobile phone transceiver.

6 Claims, 2 Drawing Sheets

ANTENNAS

This invention relates to antennas and more especially it relates to mobile phone antennas.

Radio signal transmission from known integral mobile phone antennas may produce electromagnetic radiation in and around the head of a user at quite high levels. Radiation at especially high levels tends to be produced when the position of the head is such that it is interposed between the antenna and a base station to which the mobile phone is transmitting, whereby the signal received at the base station is effectively attenuated, so that a compensatory increase in transmitted signal power from the mobile phone is produced. The effect of this high concentration of radiation in and around the brain, although not fully understood, is generally accepted to be undesirable at the frequencies used, and consequently it is desirable that it should be avoided if at all possible.

It is an important object of the present invention to provide a mobile phone antenna wherein the aforesaid disadvantage of radiation concentration in or around a user's head is obviated or at least very significantly reduced.

According to the present invention a mobile phone antenna comprises a belt which is adapted to be worn by a user and which comprises an antenna arrangement which in use is coupled to the mobile phone transceiver.

By positioning the antenna away from a user's head and on a belt which may be worn around the waist of a user, radiation in the region of a user's head is substantially reduced.

According to a preferred embodiment of the invention, the antenna arrangement comprises a plurality of antenna elements which are arranged in spaced apart relationship on a belt in a region inset from each end of the belt so as to provide for belt fixing, the elements being selectively fed via a signal feed network thereby to produce a predetermined beam pattern which tends to minimise the radiated signal power required thereby to optimise operational efficiency.

The signal feed network may comprise switches, which in use are arranged to be automatically operated so as to connect the mobile phone transmitter to an antenna element (s) which requires the least signal power for optimal operational efficiency.

Alternatively the signal feed network may comprise an adaptive weighting arrangement which serves selectively to weight the antenna elements so they tend to form an antenna beam in a direction which requires least radiated signal power.

The belt may comprise a strip of dielectric substrate material having on one side a conductive ground plane and on the other side the antenna arrangement and at opposing ends thereof a buckle and complementary piercing respectively, which are arranged mutually to co-operate for holding the belt in place around the body of a user.

The ground plane and or the antenna arrangement may be printed on opposite sides of the belt together with conductors which serve to couple the antenna arrangement to a connector via which signals are fed from the mobile to the antenna arrangement for transmission.

One embodiment of the invention will now be described by way of example only with reference to the accompanying drawings in which.

Figure 1:
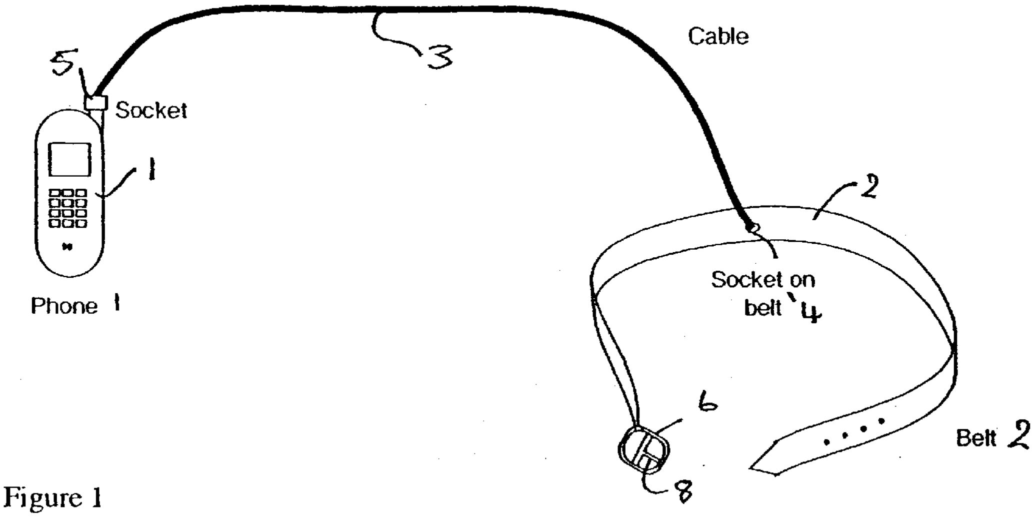
FIG. 1, is a somewhat schematic perspective view of a mobile phone which is coupled to a belt antenna.

Referring now to FIG. 1, a mobile phone 1, is provided with a belt antenna 2, suitable to be worn around the waist of a user, and comprising an antenna arrangement (not shown in FIG. 1), which is connected to the mobile phone 1, via a connection cable 3. The cable 3, is coupled at one end 4, directly to the antenna arrangement, and at the other end via a plug and socket connector 5, to the mobile phone 1. The belt 2, is provided with a buckle 6, at one end and holes 7, at the other end for the tang 8, of the buckle 6. The belt antenna 2, thus provides a support to which the mobile phone 1, can be clipped when not in use, and to which it can be connected for use.

Figure 2:
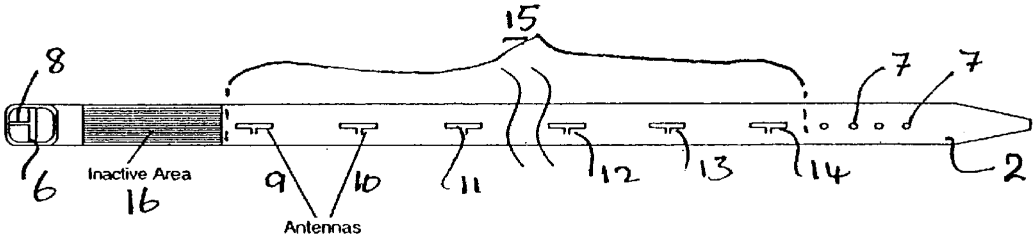
FIG. 2, is front view of a belt similar to the belt shown in FIG. 1, which embodies a multi-element antenna arrangement.
Figure 3:
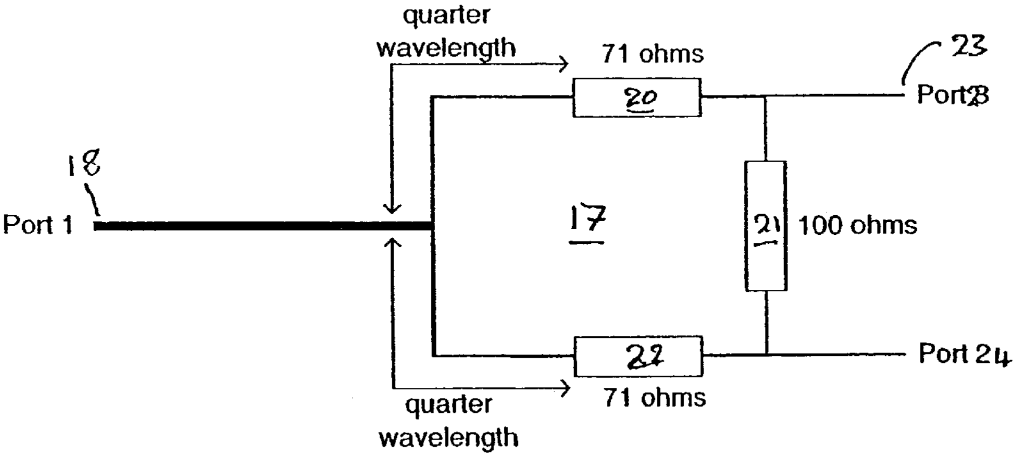
FIG. 3, is a block circuit diagram of a two way signal splitter.

As shown in FIG. 2, an antenna arrangement comprises six antenna elements 9 to 14, disposed in spaced apart relationship along a region 15, between the holes 7, at one end of the belt 2, and an inactive area 16, adjacent to the buckle 6, at the other end of the belt 2. By selectively energising the antenna elements 9, to 14, it will be appreciated that an antenna beam can be steered so as to extend in a preferred direction which requires the least radiated power to effect efficient operation. Ideally, in order to provide for uniform radiation in a selected one of a number of possible directions, the spacing between the elements should be uniform. However, although the spacing between the elements 9, to 14, is arranged to be the same in the region 15, it will be appreciated that the spacing between the elements 9, and 14, will be dependent on the waist size of the user. In order to accommodate this kind of variation, a power splitter 17, as shown in FIG. 3, may be used to couple the elements 9, and 14, so that there tends to be a more even power distribution therebetween.

The power splitter 17, comprises a first port 18, fed from the mobile 1, and an impedance matching network comprising resistors 20, 21, 22, (wherein the values shown provide for an impedance of 50 ohms in this case) via which the port 18, is coupled to ports 23, and 24, which are arranged to feed the antenna elements 9 and 14, respectively.

Figure 4:
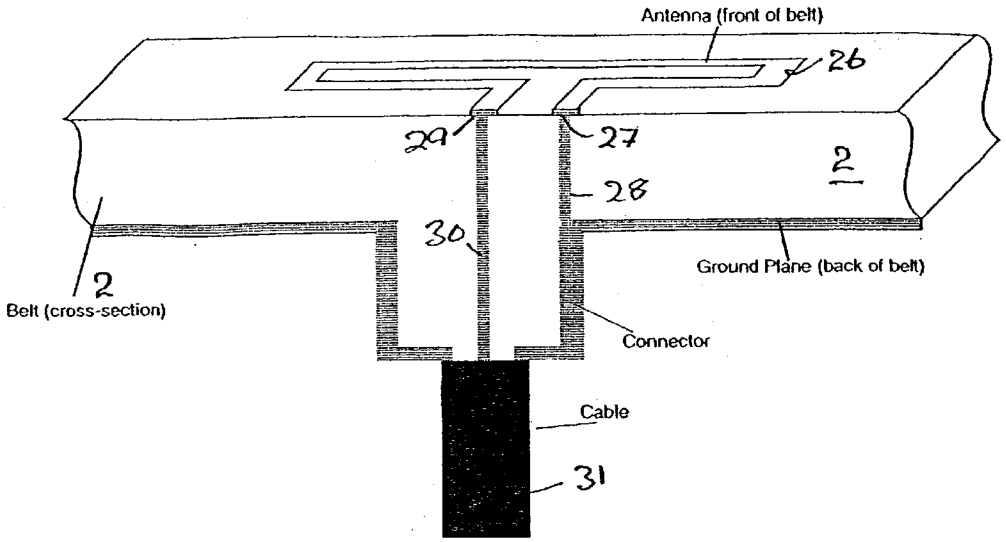
FIG. 4, is a perspective view partly in cross-section of a part of the belt as shown in FIG. 2.

Referring now to FIG. 4, the antenna elements 9 to 14, of FIG. 2, are generally similar and are supported in spaced apart relationship on one side of a dielectric substrate which forms the belt 2, a conductive ground plane 25, being provided on the other side of the belt 2. The antenna elements 9, to 14, each comprise a T shaped conductive track 26, which is connected through the belt 2, at one end 27, via a conductor 28, to the ground plane 25, and at the other end 29, via a conductor 30, to an inner conductor of a multi-core co-axial cable 31, which corresponds to a part of the cable 3, of FIG. 1, an outer screen of which is connected to the ground plane 25. Each of the antenna elements 9, to 14, is similarly connected via its own conductor in the cable 3, back to the mobile phone 1, wherein they are fed via a switch arrangement as shown in FIG. 5, so that r.f. power is fed to an antenna element(s) which require(s) least power to effect normal operation.

Figure 5:
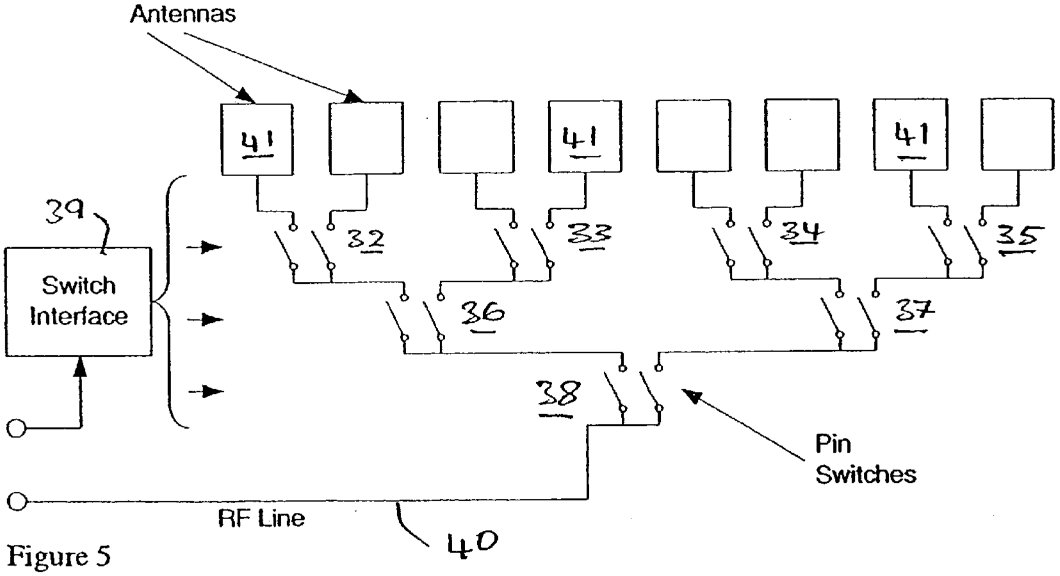
FIG. 5, is a circuit diagram of a switching arrangement for use with a multi-element belt antenna.

Referring now to FIG. 5, the switching arrangement comprises PIN switches 32, to 38, which are controlled via a switch interface 39, and supplied from an r.f. power line 40, so that antennas 41, can be selectively energised. In operation, the antennas 41, are scanned in turn during idle modes to determine which antenna element is the one with the strongest BCCH carrier (for GSM). This effectively 'dither' scans antenna elements surrounding a currently selected one during non-used time slots on the BCCH carrier, before returning to a selected antenna for the used time slots. If any of the antenna elements 41, scanned provides better performance than an antenna element currently selected, then the current selection is changed accordingly.

Although the antenna elements may be individually energised as shown in FIG. 5, or when appropriate energised via a power splitter as shown in FIG. 3, in an alternative arrangement the antenna elements may be arranged to form an adaptive phased array. In such an arrangement the switches are effectively replaced by phase and gain adjusters so that by adjusting the phase and gain weights a beam can be steered in the direction of a base station. Adaptive beam steering techniques are well known to those skilled in this art and accordingly they will not be described herein in detail. However it is apparent that with this kind of arrangement, the interface would comprise a number of analogue switches multiplexed as a common control interface from the mobile phone terminal.

Various modifications may be made to the arrangements shown without departing from the scope of the invention and for example any suitable antenna arrangement may be used fabricated to form a belt which is connected to by means of a cable to the mobile phone. Also although the arrangement described includes switching which is embodied in the mobile phone, an alternate arrangement such switching or phased array weighting as the case may be may be integrated in the belt itself.

What is claimed is:

1. A mobile phone antenna comprising:

a belt that is adapted to be worn by a mobile phone user; and an antenna arrangement which in use is coupled to the mobile phone transceiver; wherein, the antenna arrangement comprises a plurality of antenna elements arranged in spaced apart relationship on the belt in a region inset from each end of the belt, so as to provide for belt fixing; and the elements are selectively fed via a signal feed network thereby to produce a predetermined beam pattern thereby to optimize operational efficiency.

2. A mobile phone antenna as claimed in claim 1, wherein the signal feed network comprises switches, which in use are arranged to be automatically operated so as to connect the mobile phone transmitter to an antenna element(s) selected for optimal operational efficiency.

3. A mobile phone antenna as claimed in claim 1, wherein the signal feed network may comprise an adaptive weighting arrangement which serves selectively to weight the antenna elements so they tend to form an antenna beam in a selected direction.

4. A mobile phone antenna as claimed in claim 1, wherein the belt comprises a strip of dielectric substrate material having on one side a conductive ground plane and on the other side the antenna arrangement and at opposing ends thereof a buckle and complementary piercing respectively, which are arranged mutually to co-operate for holding the belt in place around the body of a user.

5. A mobile phone antenna as claimed in claim 1, wherein the ground plane and/or the antenna arrangement is/are printed on opposite sides of the belt together with conductors which serve to couple the antenna arrangement to a connector via which signals are fed from the mobile to the antenna arrangement for transmission.

6. A mobile phone assembly including a mobile phone in operative association with a mobile phone antenna, said mobile phone assembly comprising:

a belt that is adapted to be worn by a mobile phone user; and an antenna arrangement which in use is coupled to the mobile phone transceiver;

the antenna arrangement comprises a plurality of antenna elements arranged in spaced apart relationship on the belt in a region inset from each end of the belt, so as to provide for belt fixing; and the elements are selectively fed via a signal feed network thereby to produce a predetermined beam pattern thereby to optimize operational efficiency.

* * * * *